United States Patent [19]

Umeki

[11] 4,311,684
[45] Jan. 19, 1982

[54] PROCESS FOR PRODUCING IRON OXIDE CONTAINING MAGNETITE

[75] Inventor: Shinji Umeki, Tokyo, Japan

[73] Assignee: TDK Electronics Co., Ltd., Tokyo, Japan

[21] Appl. No.: 143,511

[22] Filed: Apr. 24, 1980

[30] Foreign Application Priority Data

May 11, 1979 [JP] Japan ................................. 54/58355

[51] Int. Cl.³ ............................................ C01G 49/08
[52] U.S. Cl. ............................... 423/632; 252/62.56; 252/62.59; 252/62.62; 423/634
[58] Field of Search ............... 252/62.56, 62.59, 62.62; 423/632, 634

[56] References Cited

FOREIGN PATENT DOCUMENTS

| 1250804 | 9/1967 | Fed. Rep. of Germany | 423/634 |
| 50-80499 | 6/1975 | Japan | 423/634 |
| 51464 | 5/1966 | Poland | 423/632 |
| 665554 | 1/1952 | United Kingdom | 252/62.56 |
| 267612 | 7/1970 | U.S.S.R. | 423/634 |

Primary Examiner—Jack Cooper
Attorney, Agent, or Firm—Oblon, Fisher, Spivak, McClelland & Maier

[57] ABSTRACT

In a process for producing an iron oxide having magnetite as a main component by heating to reduce a powder of an iron oxide or a hydrated iron oxide in an atmosphere for reduction, an improvement characterized in that said atmosphere for reduction comprises an inert gas, steam and a gas of an organic compound for reducing an iron oxide.

2 Claims, No Drawings

PROCESS FOR PRODUCING IRON OXIDE CONTAINING MAGNETITE

BACKGROUND OF THE INVENTION

1. Field of the Invention

The present invention relates to a process for producing an iron oxide used for a magnetic recording medium. More particularly, it relates to a process for producing a magnetite powder which imparts superior magnetic characteristics by reducing an iron oxide powder without sintering under high chemical stability even at high temperature.

2. Description of the Prior Arts

The inventors have found a process for producing magnetite powder having excellent magnetic characteristics especially coercive force by reducing an iron oxide powder with an inert gas containing a vapor of a lower alcohol instead of hydrogen gas as a reducing agent so as to prevent sintering in the reaction and to perform a stable reducing reaction which is disclosed in Japanese Examined Patent No. 24637/1978.

In the former process, the reduction temperature is limited to 450° C. When it is higher than 450° C., the reducing reaction is excessively performed to reduce a portion of magnetite into metallic iron or the sintering is resulted to cause the unstable condition of the reaction system. As a result, magnetic characteristics of magnetite as the product or $\gamma$-iron oxide obtained by oxidizing it are deteriorated.

In a reducing reaction, the reaction is completed for shorter time with higher thermal efficiency at higher temperature. Therefore, it is preferable to perform the reducing reaction at higher temperature.

The inventors have studied to improve the former process for producing magnetite as a magnetic recording medium so as to prevent said disadvantages.

SUMMARY OF THE INVENTION

It is an object of the present invention to provide a process for producing an iron oxide comprising magnetite as a main component which has superior magnetic characteristics.

It is another object of the present invention to provide a process for producing an iron oxide comprising magnetite as a main component under high chemical stability without sintering even at high temperature in the reducing reaction.

The foregoing and other objects of the present invention have been attained by producing an iron oxide having magnetite as a main component which is used for a magnetic recording medium by heating to reduce a powder of an oxide or a hydrated oxide comprising an iron oxide as a main component in an atmosphere comprising an inert gas, steam and a gas of an organic compound for reducing an iron oxide.

DETAILED DESCRIPTION OF THE PREFERRED EMBODIMENTS

The starting materials in the process of the present invention include hydrated iron oxides such as goethite and lepidocrosite; $\alpha$-ion oxides obtained by dehydrating the hydrated iron oxide; and hydrated iron oxides and $\gamma$-iron oxides which incorporate a small amount of a Si or Al component as a sintering proofing agent, or a small amount of a Zn or Ni component for controlling a size or shape of the particle; or a small amount of a Co or Mn component for improving the coercive force of the product.

The particles of the magnetite obtained by a reduction of the hydrated iron oxide is usually has a length of 0.1 to $2\mu$ preferably 0.2 to $1\mu$ and an acicular ratio of 2 to 40 preferably 5 to 20.

The aqueous solution of ferrous ion can be produced by dissolving a ferrous compound such as ferrous chloride, ferrous sulfate, ferrous nitrate etc. in water. A concentration of the ferrous compound is from a saturated concentration to 0.5 wt.% preferably 5 to 40 wt.% especially 10 to 30 wt.%.

The base is preferably sodium hydroxide, carbonate or bicarbonate or potassium hydroxide, carbonate or bicarbonate or ammonium hydroxide.

The concentration of the base is usually 1 to 40 wt.% preferably 5 to 30 wt.%.

The oxidizing agent can be alkali chlorates, air, oxygen, ozone and alkali nitrates. The oxidizing agent is added at a ratio of more than a stoichiometric amount for converting a ferrous compound into a ferric compound. The oxidizing agent can be added before, during or after the mixing of the aqueous solution of ferrous ion with the base, since the oxidation is performed after forming ferrous hydroxide. That is, the oxidizing agent can be mixed with the base or a slurry of ferrous hydroxide. The temperature for the oxidation is usually in a range of 0° to 80° C. preferably 5° to 60° C. especially 20° to 50° C.

The conventional air bubbling oxidation method can be also employed.

The preparation of a hydrated iron oxide can be modified as desired.

The organic compounds for reducing an iron oxide can be the lower alcohols; ketones such as acetone and methyl ethyl ketone; hydrocarbons, ethers and esters.

The steam can be fed by any manners such as a bubbling of an inert gas into water or an aqueous solution or a spraying or a steaming. The ratio of steam is usually 2 to 500% preferably 10 to 200% based on the reducing agent such as alcohols, ketones, esters and hydrocarbons. The steam can be fed to be the saturated condition. When the steam is fed by bubbling an inert gas into an aqueous solution of an organic compound such as alcohol, the concentration of the organic compound should be selected so as to give a satisfactory steam such as less than 50%.

The organic compounds can be alcohols such as methanol, ethanol, propanol, butanol, octanol, phenol, ketones such as acetone, methyl ethyl ketone; ethers; esters and hydrocarbons such as methane, ethane, propane, butane, benzene, toluene, xylene which should have a reducing function at a temperature of 400° to 700° C.

The atmosphere for reduction can be formed by bubbling an inert gas such as $N_2$ gas into a solution of a mixture of water and an organic compound such as ethanol and acetone at an ambient temperature so as to coexist steam and a vapor of the organic compound. The atmosphere for reduction can be also formed by separately feeding a gas or vapor of the organic compound and steam to mix them. When the organic compounds is a liquid form, the concentration of the vapor of the organic compound can be increased by heating the organic compound. The ratio of steam to the organic compound can be varied as desired.

The resulting magnetite powder can be converted into $\gamma$-iron oxide by oxidizing it, if necessary.

In accordance with the present invention, the chemical stability in the step of reducing an iron oxide powder is high and the sintering is not resulted even though the temperature in the reducing reaction is high. The adverse effect for the magnetic characteristics of the product caused by heating at high temperature is eliminated. Moreover, the coercive force of the product is increased for 10 to 30% and the intensity of magnetization is increased for 1 to 6% in comparison with the product obtained by the former process. Therefore, the magnetic recording medium obtained by using the magnetic powder has the improved sensitivity and frequency characteristics. The fine magnetic powder has superior SN ratio which is required in a compact magnetic recording system developed recently.

The present invention will be further illustrated by certain examples and references which are provided for purposes of illustration only and are not intended to be limiting the present invention.

EXAMPLE 1

In a quartz boat, 10 g. of acicular hydrated iron oxide containing 1.1 wt.% of $SiO_2$ component which had a specific surface area of 54.7 m$^2$/g (measured by BET method) and an average length of 0.4μ was charged and the port was set in a reducing furnace. Nitrogen gas was fed into 10% aqueous solution of ethanol at a rate of 0.5 liter per minute under bubbling at an ambient temperature and the mixed gas was fed into the reducing furnace which was heated at about 600° C. for 1 hour and then the furnace was cooled to obtain a magnetite powder. A part of the magnetite powder was heated in air at 250° C. for 1 hour to obtain $\gamma$-$Fe_2O_3$ powder. The condition of the reaction and the magnetic characteristics of the products are shown as Samples A-1 and A-2 in Table 1. The magnetic characteristics of the products obtained by reducing at 500° C. or 400° C. are also shown as Samples A-3 and A-4 in Table 1.

REFERENCE 1

In accordance with the process of Example 1 except using 99.5% ethanol instead of 10% aqueous solution of ethanol and reducing at 400° C., the test was carried out. The magnetic characteristics of the product are shown as Samples C-1 and C-2 in Table 1.

As it is clearly found from the data of Example 1 and Reference 1, Samples A-1 and A-2 (Example 1) had superior coercive force Hc and sigma S to those of Samples C-1 and C-2 (Reference 1). In the process of the present invention, when the reduction temperature was high as 400° C., the magnetic characteristics of the product were similar to those of the Reference. However, in accordance with the process of Reference 1, except raising the reduction temperature to 500° C. or 600° C., the test was carried out. As a result, a part of the product was sintered or chemically unstable to cause spontaneous combustion in air whereby a part of the product was converted into α-iron oxide.

EXAMPLE 2

In accordance with the process of Example 1 except using an acicular hydrated iron oxide containing 5 wt.% of Zn component (based on Fe) which had a specific surface area of 102 m$^2$/g (measured by BET method) and an average length of 0.25μ, the test was carried out. The magnetic characteristics of the product are shown as Samples B-1, B-2 and B-3 in Table 1.

REFERENCE 2

In accordance with the process of Example 2 except using 99.5% ethanol instead of 10% aqueous solution of ethanol, and reducing at 400° C., the test was carried out. The magnetic characteristics of the product are shown as Sample C-3 in Table 1.

Sample B-1 had superior coercive force Hc and sigma S to those of Sample C-2.

The Zn component was incorporated because of reducing the particle size in comparison with that of the product having no Zn component. When the magnetic powder incorporating Zn component was used for the magnetic recording medium, the magnetic recording medium having superior S/N could be obtained.

EXAMPLE 3

In accordance with the process of Example 1 except using the starting materials used in Examples 1 and 2 and using 3% aqueous solution of acetone as the reducing agent, the tests were carried out. The magnetic characteristics of the products are shown as Samples A-5 and B-4 in Table 1. The characteristics of Samples A-5 and B-4 were substantially the same as those of Samples A-1 and B-1, respectively.

EXAMPLE 4

In accordance with the process of Example 1 except using $\gamma$-iron oxide obtained by heating the hydrated iron oxide of Example 1 at 400° C. for 1 hour in air, as the starting material, the test was carried out. The magnetic characteristics of the product are shown as Sample A-6 in Table 1. The characteristics of Sample A-6 were substantially the same as those of Sample 1.

TABLE 1

| Sample | Reducing agent | Temp. in reduction (°C.) | Temp. in oxidation (°C.) | Hc (Oe) | Sigma S (emu/g) | Sigma R (emu/g) | Square ratio |
|---|---|---|---|---|---|---|---|
| A-1 | 10% aq. ethanol | 600 | | 448 | 81.2 | 38.8 | 0.478 |
| A-2 | 10% aq. ethanol | 600 | 250 | 426 | 72.3 | 36.2 | 0.501 |
| A-3 | 10% aq. ethanol | 500 | | 427 | 81.7 | 38.5 | 0.471 |
| A-4 | 10% aq. ethanol | 400 | | 407 | 74.3 | 35.6 | 0.479 |
| A-5 | 3% aq. acetone | 600 | | 440 | 81.0 | 38.7 | 0.478 |
| C-1 | 99.5% ethanol | 400 | | 413 | 80.7 | 38.5 | 0.477 |
| C-2 | 99.5% ethanol | 400 | 250 | 389 | 71.8 | 36.0 | 0.501 |
| B-1 | 10% aq. ethanol | 600 | | 388 | 74.4 | 30.7 | 0.413 |
| B-2 | 10% aq. ethanol | 500 | | 360 | 71.8 | 29.0 | 0.404 |
| B-3 | 10% aq. ethanol | 400 | | 294 | 68.4 | 25.6 | 0.374 |
| B-4 | 3% aq. acetone | 600 | | 387 | 73.0 | 30.1 | 0.412 |
| C-3 | 99.5% ethanol | 400 | | 309 | 70.5 | 28.4 | 0.403 |
| A-6 | 10% aq. ethanol | 600 | | 443 | 81.4 | 38.9 | 0.478 |

I claim:

1. In a process for producing an iron oxide comprising magnetite as the main component by heating a powder of goethite, lepidocrosite, α-iron oxide or γ-iron oxide in a reducing atmosphere, the improvement comprising using as the reducing atmosphere an inert gas containing steam and a gas of an organic compound for reducing an iron oxide selected from the group consisting of lower alcohols, ketones, ethers, esters and hydrocarbons; wherein the ratio of steam to the gas of an organic compound is in the range of 2–500% by volume; and wherein the heating is carried out at 500° to 700° C.; the iron oxide comprising magnetite being unsintered and chemically stable and exhibiting a higher $H_c$ than the iron oxide comprising magnetite prepared as above but heated at a lower temperature.

2. The process according to claim 1, wherein the improvement further comprises forming said reducing atmosphere by bubbling the inert gas through an aqueous mixture of water and the organic compound.

* * * * *